United States Patent
Ishibashi

(10) Patent No.: US 6,314,188 B1
(45) Date of Patent: *Nov. 6, 2001

(54) MOTION PICTURE DATA ENCRYPTING METHOD AND COMPUTER SYSTEM AND MOTION PICTURE DATA ENCODING/DECODING APPARATUS TO WHICH ENCRYPTING METHOD IS APPLIED

(75) Inventor: Yasuhiro Ishibashi, Tokyo (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/384,236

(22) Filed: Aug. 27, 1999

Related U.S. Application Data

(63) Continuation of application No. 08/950,495, filed on Oct. 14, 1997, now Pat. No. 6,021,199.

(30) Foreign Application Priority Data

Nov. 14, 1996 (JP) .................................................... 8-302986

(51) Int. Cl.⁷ ...................................................... H04K 1/00
(52) U.S. Cl. ........................... 380/201; 380/201; 380/203; 380/210; 380/217; 380/239; 704/500; 704/501; 704/503; 704/504; 386/94; 386/124; 386/125
(58) Field of Search .................................. 380/201, 203, 380/210, 217, 239; 704/500, 501, 503, 504; 386/94, 124, 125

(56) References Cited

U.S. PATENT DOCUMENTS

| | | | |
|---|---|---|---|
| 5,598,276 | 1/1997 | Cookson et al. | 386/46 |
| 5,600,721 | 2/1997 | Kitazato | 380/20 |
| 5,621,794 | 4/1997 | Matsuda et al. | 380/20 |
| 5,805,700 | 9/1998 | Nardone et al. | 380/10 |
| 5,838,791 | * 11/1998 | Torii et al. | 380/20 |
| 5,883,958 | * 3/1999 | Ishiguro et al. | 380/4 |
| 5,894,518 | * 4/1999 | Shiojiri | 380/20 |
| 5,915,018 | * 6/1999 | Aucsmith | 380/4 |
| 5,917,910 | * 6/1999 | Ishiguro | 380/4 |
| 5,963,909 | * 10/1999 | Warren et al. | 705/1 |
| 5,991,403 | * 11/1999 | Aucsmith et al. | 380/10 |

(List continued on next page.)

FOREIGN PATENT DOCUMENTS

0540961A2 * 10/1992 (EP) .

OTHER PUBLICATIONS

"DVD Copy Protection, An Agreement At Last?", Dana J. Parker, Emedia, vol. 9, Issue 12, pp. 89–90, Dec. 1996.*
"Intel Weighs In On DVD Encryption", Junko Yoshida, Electronic Engineering Times, Issue 923, pp. 1,142, Oct. 14, 1996.*
"DVD Video Encryption Update: Hollywood, Having Cake and Eating It", Kilroy Hughes, Emedia, vol. 10, Issue 6, pp. 54–59 Jun. 1997.*

Primary Examiner—Albert Decady
Assistant Examiner—Paul E. Callahan
(74) Attorney, Agent, or Firm—Pillsbury Winthrop LLP

(57) ABSTRACT

Of I, P, and B pictures contained in an MPEG 2 data stream, only the I picture is subjected to encryption such as scramble processing. Scramble rule data used at that time is stored in the lead-in area of an optical disk. A software DVD decoder reads the scramble rule data stored in the lead-in area, and its certification control module descrambles only the I picture. With this processing, the CPU power required for descramble processing can be reduced, and motion picture data can be decoded by the software DVD decoder in real time.

12 Claims, 5 Drawing Sheets

U.S. PATENT DOCUMENTS 5,991,500 * 11/1999 Kanota et al. .......................... 386/94
6,016,348 * 1/2000 Blatter et al. ............................ 380/5
6,021,199 * 2/2000 Ishibashi ................................ 380/10
6,035,044 * 3/2000 Itoi ........................................ 380/10

* cited by examiner

MOTION PICTURE DATA ENCRYPTING METHOD AND COMPUTER SYSTEM AND MOTION PICTURE DATA ENCODING/ DECODING APPARATUS TO WHICH ENCRYPTING METHOD IS APPLIED

The appln. is a continuation of Ser. No. 08/950,495 filed Oct. 14, 1997, U.S. Pat. No. 6,021,199.

BACKGROUND OF THE INVENTION

The present invention relates to a method of encrypting motion picture data, and a computer system and motion picture data encoding/decoding apparatus to which this method is applied.

In recent years, with the advance in computer technology, various multimedia personal computers have been developed. A personal computer of this type can reproduce not only text data and graphics data but also motion picture data and audio data.

Generally, motion picture data is compressed and encoded in accordance with the MPEG (Moving Picture Experts Group) 1, and stored in a CD (Compact Disk). The motion picture data is decoded, displayed, and reproduced using a dedicated expansion board. As an expansion board for decoding, displaying, and reproducing motion picture data, e.g., "REAL Magic" available from Sigma Designs, Inc., USA is well known. This "REAL Magic" has a video decode function complying with the MPEG 1 standard. The decoded motion picture data is synthesized with VGA graphics received from a video card via a feature connector, and the synthesized motion picture is displayed.

The MPEG 1 standard, however, assumes the use of a CD having a data transfer rate of about 1.5 Mbps. Processing motion picture data containing a large amount of image data such as a movie leads to a degradation in image quality, and the like.

Recently, a DVD (Digital Versatile Disk) has been developed as a new-generation storage medium having a data transfer rate substantially higher than that of the CD. The DVD has a new video disk standard capable of recording video data such as a movie with a high image quality on an optical disk having the same size as that of the CD by using motion picture coding called the MPEG 2. A recording/ reproducing method for the DVD is based on variable rate coding in order to ensure acceptable levels for both the image quality and the recording time with respect to the capacity. The amount of variable-rate encoded data depends on the quality of an original image. A more abruptly changing scene requires a larger amount of data.

When motion picture data stored in the DVD is to be reproduced on a personal computer, the data is read from a DVD-ROM in the main memory of the computer, and transferred to a DVD decoder. In this case, to prevent illegal copying of the data loaded in the main memory, and its illegal use, all video data included in the motion picture data must be subjected to encryption such as scramble processing.

For a recent higher-speed CPU, a so-called software decoder is desired to be realized to decode motion picture data not by dedicated hardware but by software. If the motion picture data is decoded by the software decoder, the dedicated hardware can be omitted to reduce the cost of the whole system.

However, in the use of the software decoder, the descramble processing of descrambling the scrambled motion picture data must be executed by the CPU, in addition to original processing of decoding motion picture data encoded in accordance with the MPEG 2. Since descramble processing is performed for all video data contained in the motion picture data, the load due to descramble processing on the CPU is very large. Therefore, most of the CPU power (load) is used by descramble processing, and decode processing is practically difficult to perform in real time.

As described above, since all video data is scrambled in the prior art, a large CPU power is required for descramble processing. Therefore, it is practically difficult to simultaneously satisfy the copy protect function and the software decoder.

BRIEF SUMMARY OF THE INVENTION

It is an object of the present invention to provide a motion picture data encrypting method capable of preventing illegal use such as illegal display/reproduction of motion picture data by encrypting only part of the motion picture data, and simultaneously satisfying a copy protect function and a software decoder, and a computer system and motion picture data encoding/decoding apparatus to which this method is applied.

To achieve the above object, according to the present invention, there is provided a motion picture data encrypting/decrypting method of encrypting digitally compressed/encoded motion picture data containing an intraframe encoded image and an interframe predictive encoded image, thereby preventing illegal use of the motion picture data, comprising the steps of: performing scramble processing by calculating, from the digitally compressed/ encoded motion picture data, the intraframe encoded image on the basis of a predetermined rule; storing the motion picture data including the intraframe encoded image having undergone the scramble processing in an optical disk as a program area of a data sequence constituted by a lead-in area, the program area, and a lead-out area, and storing a scramble rule representing a calculation rule for the scramble processing in the lead-in area; reading the motion picture data in the program area from the optical disk; and executing descramble calculation processing for the intraframe encoded image contained in the read motion picture data on the basis of scramble data, thereby decrypting the motion picture data.

In the present invention, scramble rule data representing a calculation rule for scramble processing is stored in the lead-in area of an optical disk, motion picture data is read from the program area of the optical disk, and descramble calculation processing is performed for an intraframe encoded image contained in the motion picture data on the basis of the scramble data.

According to the present invention, the intraframe encoded image within some of a plurality of packs which constitute the motion picture data is scrambled, and data representing the location of the scrambled intraframe encoded image is stored in the header portion of the motion picture data. The scrambled intraframe encoded image in some of the plurality of packets is descrambled and decoded on the basis of the intraframe encoded image location data stored in the header portion, and the scramble rule stored in the lead-in area of the optical disk.

In this motion picture data encrypting method, motion picture data digitally compressed/encoded in accordance with the MPEG 2 or the like has an intraframe encoded image (I picture), and interframe predictive encoded images (P and B pictures) based on unidirectional prediction and bidirectional prediction. The interframe predictive encoded images (P and B pictures) are decrypted using the intraframe encoded image (I picture). Since the interframe predictive encoded images (P and B pictures) cannot be correctly decrypted without the intraframe encoded image (I picture), only the intraframe encoded image (I picture) is subjected to encryption such as scramble processing. At that time, the scramble rule for scramble processing is stored in the lead-in area of the optical disk. In decryption, the scramble rule is read from the lead-in area to perform descramble, thereby decrypting the motion picture data. The contents of the lead-in area cannot be referenced to a general file system. For this reason, if the scramble rule data is stored i n the lead-in area, the scramble rule data can be protected from illegal access.

With this processing, illegal display/reproduction can be prevented by scrambling not all image data contained in the motion picture data but only part of the motion picture data. Therefore, in the use of a software decoder, the CPU power required for descramble processing can be reduced, and the motion picture data can be decoded by the software decoder in real time.

As described above, according to the present invention, illegal use such as illegal display/reproduction of the motion picture data can be prevented by encrypting only part of the motion picture data, and the copy protect function and the software decoder can be simultaneously satisfied.

Additional objects and advantages of the invention will be set forth in the description which follows, and in part will be obvious from the description, or may be learned by practice of the invention. The objects and advantages of the invention may be realized and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

DETAILED DESCRIPTION OF THE INVENTION

An embodiment of the present invention will be described below with reference to the several views of the accompanying drawing.

Figure 1:
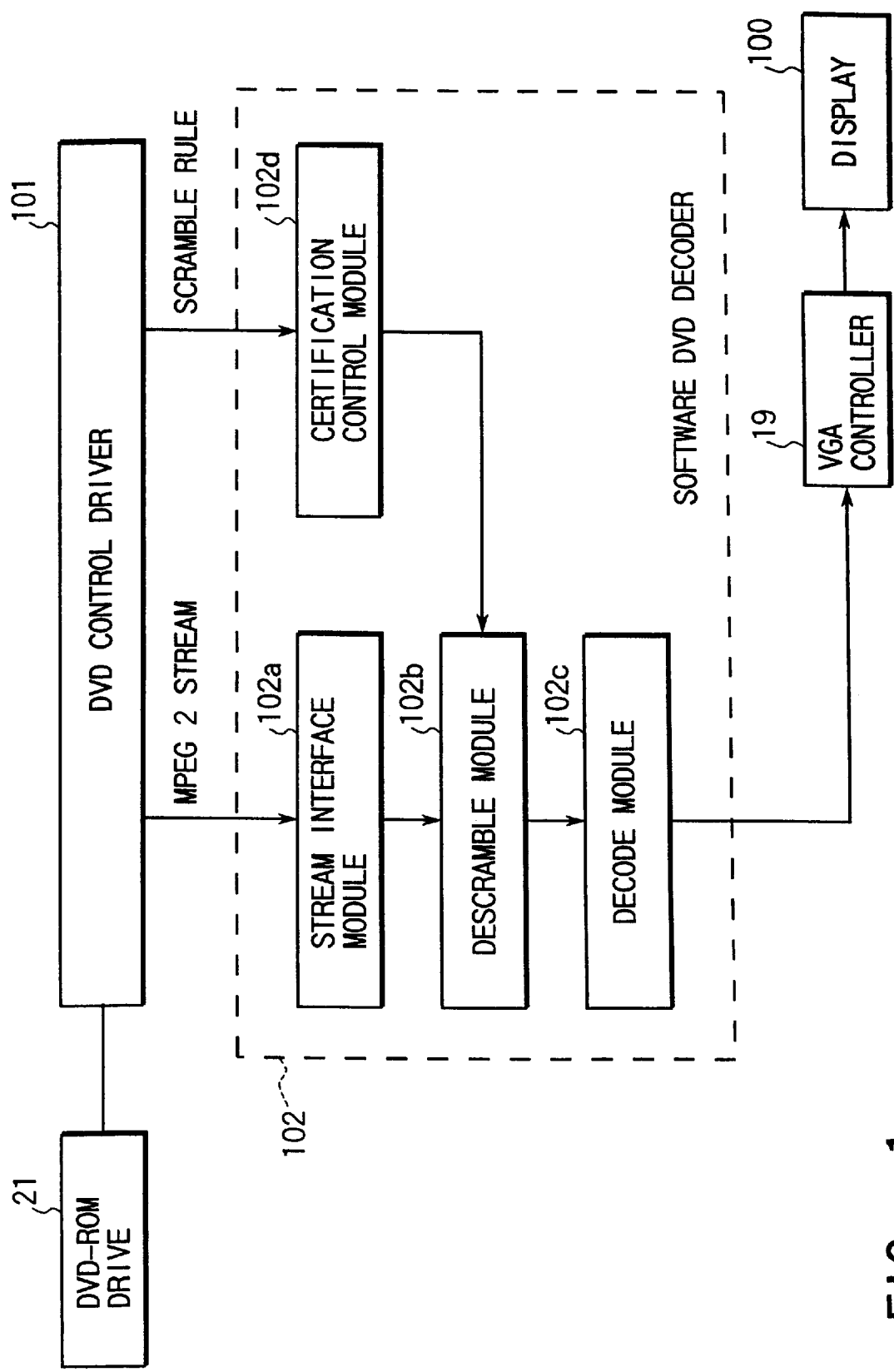
FIG. 1 is a block diagram showing the functional arrangement of a software decoder used in a computer system according to an embodiment of the present invention.

FIG. 1 shows the arrangements of a software decoder used in a computer system according to an embodiment of the present invention, and its peripheral software and hardware. A DVD-ROM drive 21 is used to read an MPEG 2 data stream having video data, audio data, and a sub picture stored in a DVD medium constituted by an optical disk. The motion picture data stream stored in the DVD medium has a data format like the one shown in FIG. 2.

Figure 2:
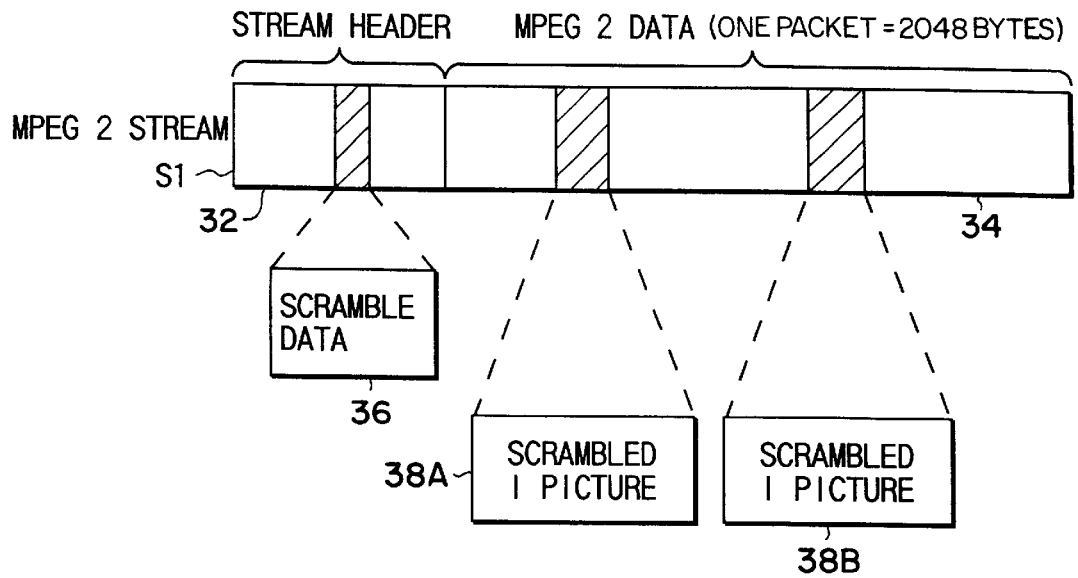
FIG. 2 is a view showing the data structure of a motion picture data stream used in this embodiment.

More specifically, the data stream is constituted by a plurality of sectors. As for motion picture data, each sector S1 is constituted by a stream header portion 32 and an MPEG 2 data portion 34, as shown in FIG. 2. The MPEG 2 data portion includes an image digitally compressed and encoded in accordance with the MPEG 2 standard, i.e., I, P, and B pictures. Of these pictures, the image of the I picture is scrambled 38A, 38B by a predetermined calculation rule, whereas the remaining P and B pictures are not scrambled. The stream header portion includes scramble data 36 representing the location of the scrambled image data 38A, 38B, i.e., the location of the I picture. The scrambled data 36 may be encrypted. An encoding apparatus for generating an MPEG 2 data stream in this data format has an arrangement shown in FIG. 4.

Figure 4:
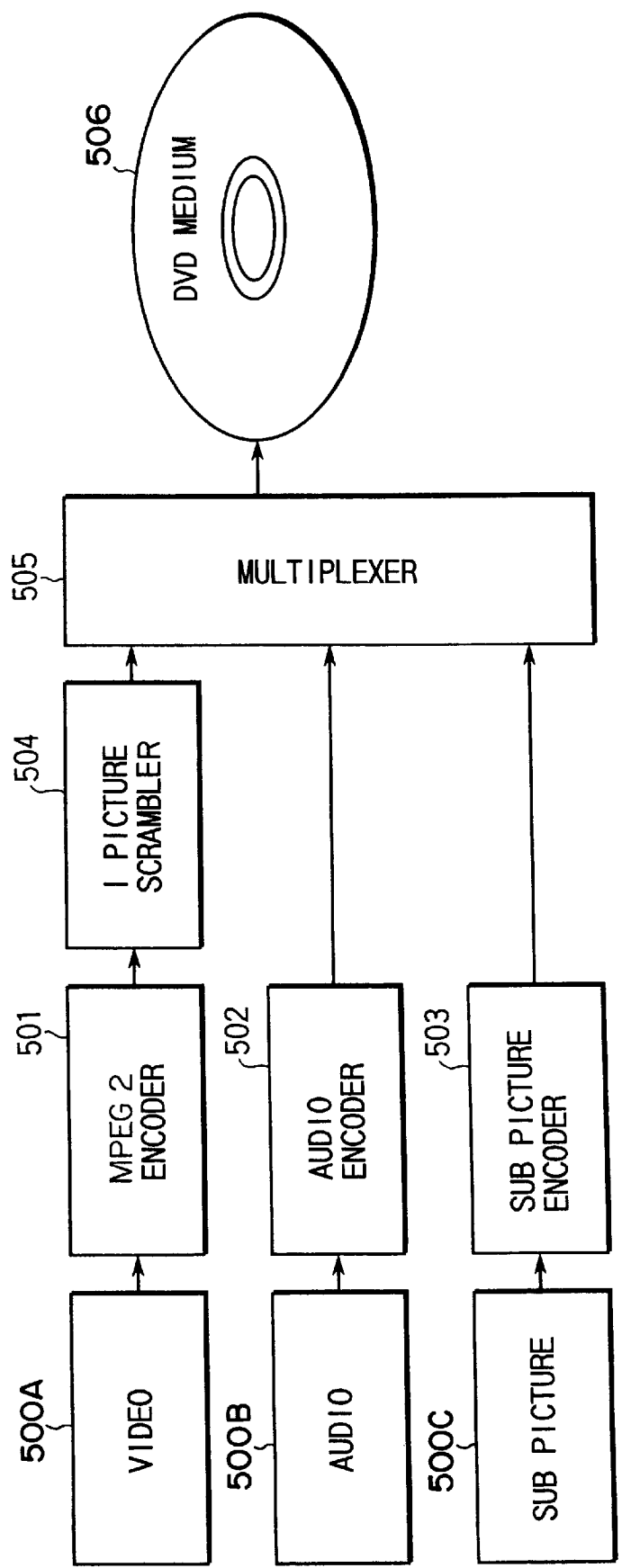
FIG. 4 is a block diagram showing the arrangement of an encoding apparatus used in this embodiment.

That is, as shown in FIG. 4, the encoding apparatus comprises an MPEG 2 encoder 501 for digitally compressing and encoding video data corresponding to the main video image of a movie in accordance with the MPEG 2, an audio encoder 502 for digitally compressing and encoding an audio signal in accordance with the Dolby AC3, and a sub picture encoder 503 for digitally compressing and encoding a sub picture such as a caption in accordance with runlength coding or the like. The video data 500A encoded by the MPEG 2 encoder 501 contains the above-described I, P, and B pictures. The picture is extracted from the video data and scrambled by an I picture scrambler 504. The encoded video data 500A, the audio data 500B, and the sub picture data 500C are multiplexed by a multiplexer 505 into one MPEG 2 program stream, which is stored in the DVD medium 506.

A DVD control driver 101 in FIG. 1 is software for controlling the read operation for the MPEG 2 data from the DVD-ROM drive 21. In reproducing a motion picture, the DVD control driver 101 reads the MPEG 2 data from the DVD-ROM drive 21, and transfers it to a software DVD decoder 102. The DVD control driver 101 can also be implemented as part of the OS (Operating System).

The software DVD decoder 102 is used to decode the MPEG 2 data stored in the DVD medium. As shown in FIG. 1, the software DVD decoder 102 is constituted by a stream interface module 102a, a descramble module 102b, a decode module 102c, and a certification control module 102d. The stream interface module 102a obtains the MPEG 2 data portion and the scramble data described with reference to FIG. 2 from the DVD-ROM drive 21 via the DVD control driver 101, and transfers them to the descramble module 102b.

The certification control module 102d communicates with the DVD-ROM drive 21 directly or via the DVD control driver 101, and performs certification processing of informing the DVD-ROM drive 21 that this software module is legal. If it is recognized that the software module is legal, the read operation for scramble rule data from the DVD-ROM drive 21 is permitted. This scramble rule data represents the calculation rule of scramble processing performed for the I picture. This scramble rule data has also undergone predetermined encryption processing. The certification control module 102d decodes the scramble rule data, and transfers the decoded data to the descramble module 102b. The certification control module 102d uses a certification algorithm described in, e.g., "Standard Interface for DVD-ROM Device is Solidified; Safety Exchange Procedure of Encryption Key is Defined", NIKKEI ELECTRONICS, Nov. 18, 1996 (No. 676), pp. 13–14.

Figure 3:
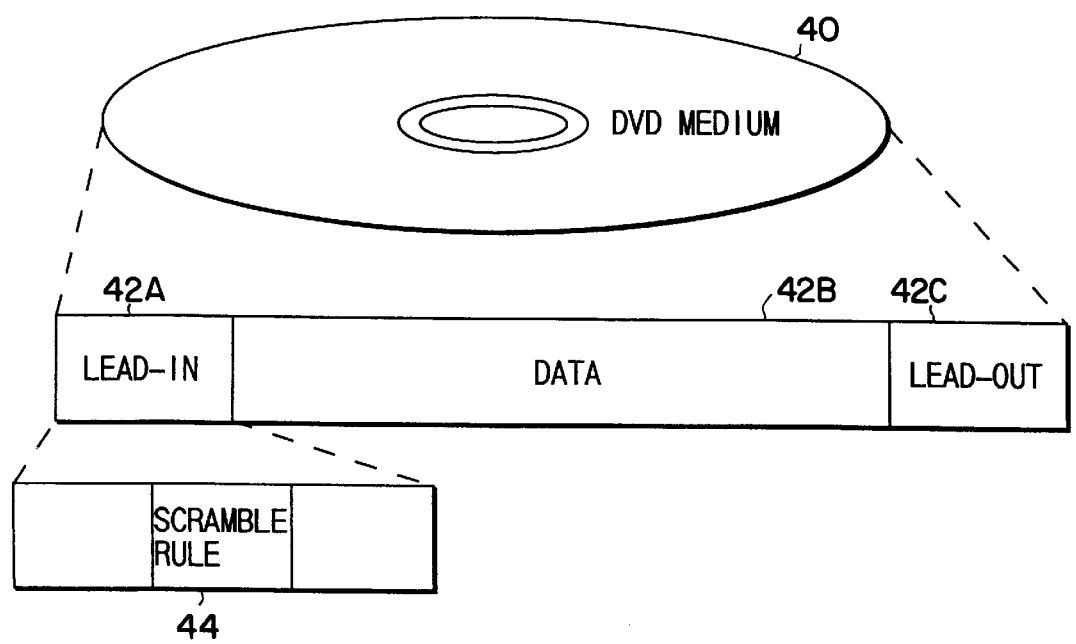
FIG. 3 is a view showing the storage location of scramble rule data used in this embodiment.

The scramble rule data is preferably stored in a position, where the data cannot be read by a general file system, of one data sequence over the innermost to outermost tracks of the DVD medium 40, i.e., a lead-in area 42A. That is, in the data storage format of a storage medium such as an optical disk, data is constituted by a lead-in area 42A, a data area 42B, and a lead-out area 42C, as shown in FIG. 3. The contents of the lead-in area cannot be referenced to by a general file system. Therefore, if the scramble rule data is stored in the lead-in area, it can be protected from unauthorized access.

The descramble module 102*b* specifies the location of the I picture contained in the MPEG 2 data portion on the basis of the scramble data, and extracts the I picture from the MPEG 2 data portion. The descramble module 102*b* executes the calculation for descrambling the scrambled I picture on the basis of the scramble rule data obtained from the certification control module 102*d*.

The decode module 102*c* decodes the MPEG 2 data to expand it to original data before compression. The decode module 102*c* decodes not only video data but also sub picture data and audio data. The decoded video data is synthesized with the decoded sub picture, sent to a VGA controller 19, and displayed on a display 100. The decoded audio data is reproduced by an audio controller.

Figure 5:
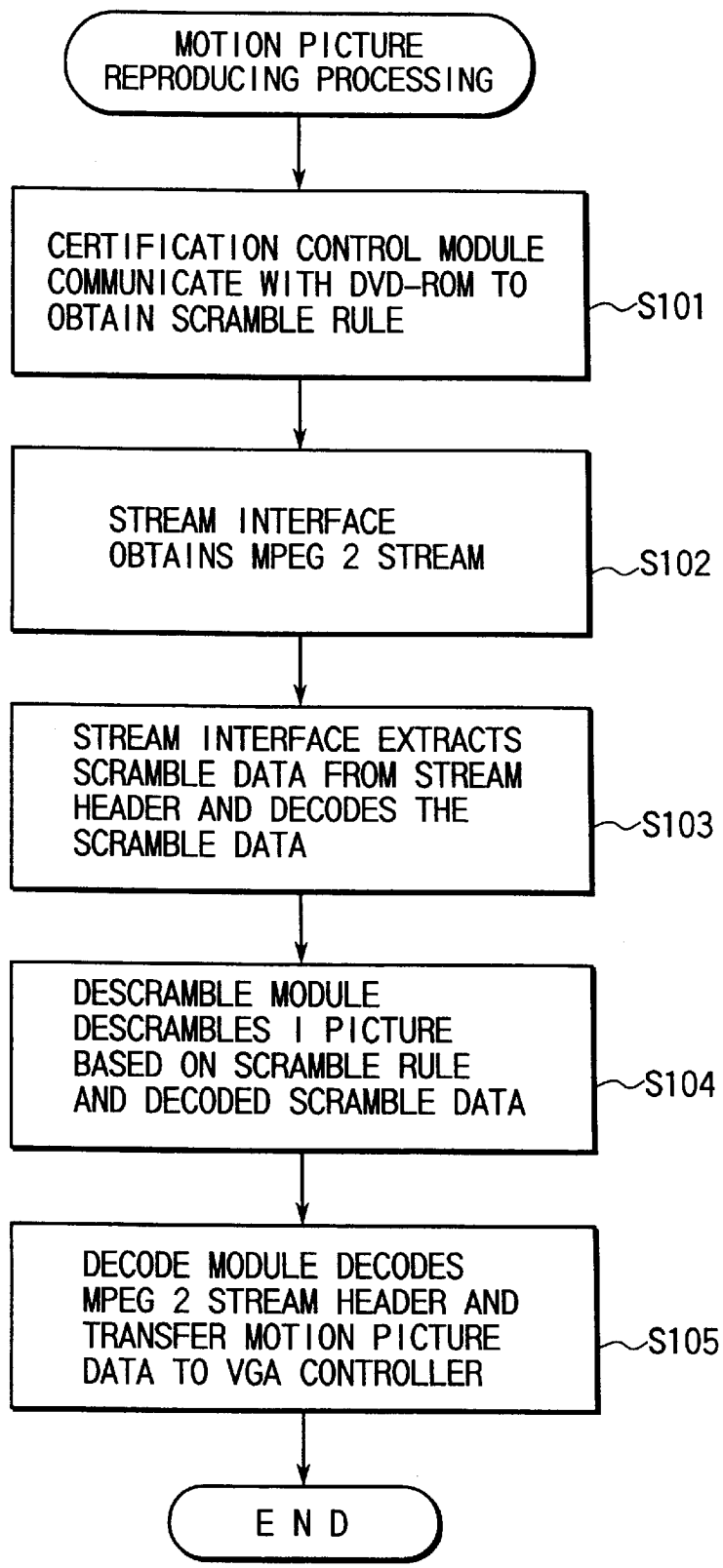
FIG. 5 is a flow chart showing the procedure of reproducing a motion picture in this embodiment.

The procedure of reproducing a motion picture will be explained below with reference to a flow chart in FIG. 5.

When a motion picture data reproduction requirement is sent from a motion picture data reproduction application program, the certification control module 102*d* communicates with the DVD-ROM drive 21 to obtain a scramble rule and decode it (step S101). The stream interface module 102*a* obtains an MPEG 2 stream, and transfers the scramble data and the MPEG 2 data to the descramble module (step S102). At this time, the scramble data is also decoded, as needed (step S103). The scramble data can also be decoded by the descramble module 102*b*.

The descramble module 102*b* specifies the location of an I picture contained in the MPEG 2 data on the basis of the scramble data, and executes processing of descrambling the scrambled I picture on the basis of the scramble rule data obtained from the certification control module 102*d* (step S104). The decode module 102*c* decodes the MPEG 2 data to reproduce a motion picture and a sound (step S105).

As described above, in this embodiment, the MPEG 2 data stream contains the I picture having undergone intraframe coding, and the P and B pictures having undergone interframe predictive coding based on unidirectional prediction and bidirectional prediction. Since the P and B pictures cannot be correctly decrypted without the I picture, only the I picture is subjected to encryption such as scramble processing. With this processing, illegal display/reproduction can be prevented by scrambling not all image data but only part of motion picture data. Therefore, the CPU power required for descramble processing can be reduced, and the motion picture data can be decoded by the software DVD decoder 102 in real time.

Figure 6:
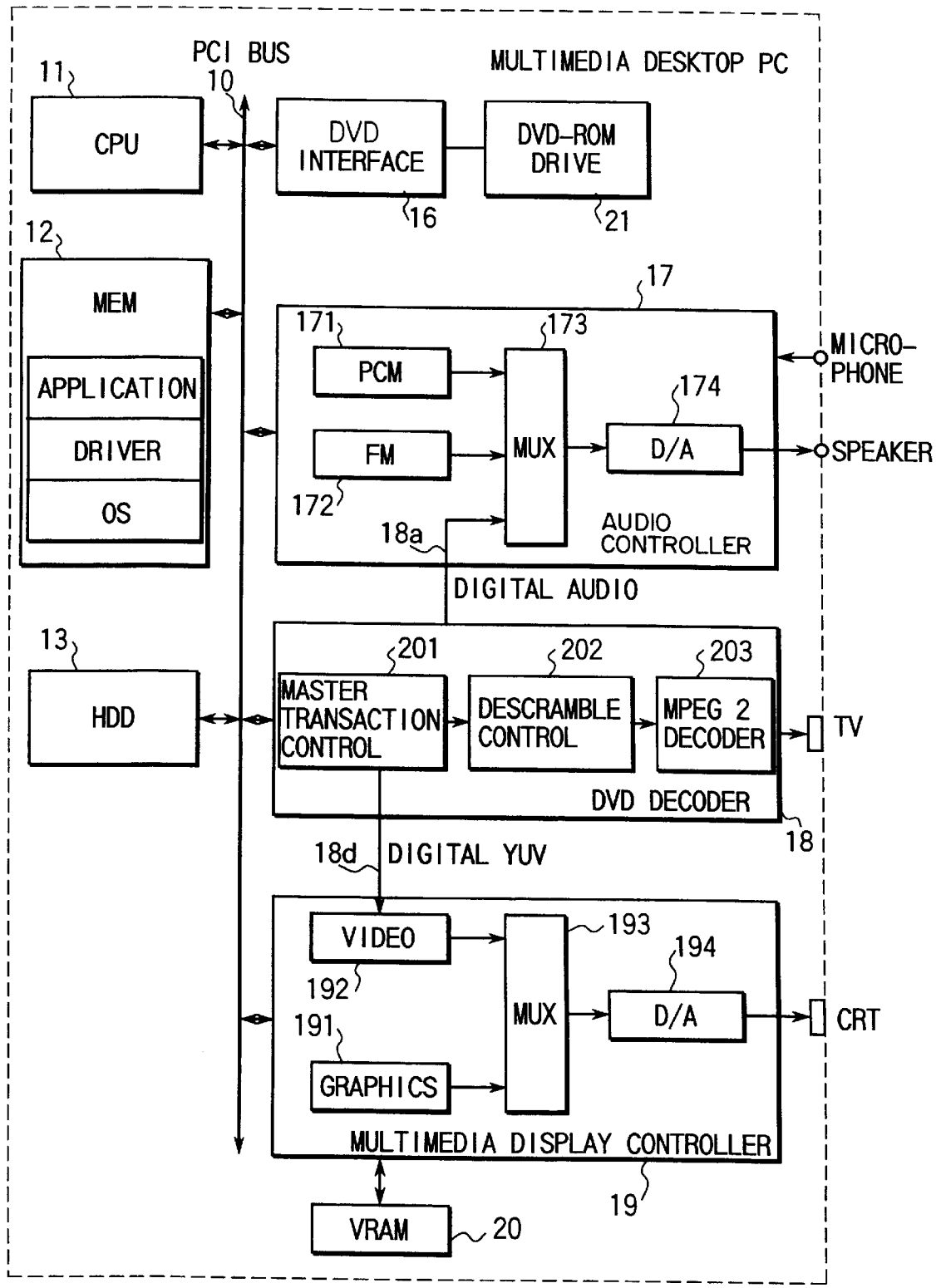
FIG. 6 is a block diagram showing the hardware arrangement of the system in this embodiment.

In a computer system having a dedicated hardware decoder, descramble processing and decode processing can be executed by the hardware decoder. In this case, since descramble processing is performed for only the I picture, a descramble processing circuit can be simplified. FIG. 6 shows an example of the arrangement of the computer system having the dedicated hardware decoder.

This system conforms to a desktop personal computer, which comprises a PCI bus 10, a CPU 11, a main memory (MEM) 12, an HDD 13, a DVD interface 16 constituted by an ATAPI or SCSI interface, an audio controller 17, a DVD decoder 18, a multimedia display controller 19, and a video memory (VRAM) 20, as shown in FIG. 6. The DVD-ROM drive 21 storing motion picture data encoded in accordance with the MPEG 2, and the like is connected to the DVD interface 16.

The CPU 11 controls the operation of the whole system, and executes an operating system stored in the system memory (MEM) 12, and the program of an application to be executed. Data recorded in the DVD-ROM drive 21 is transferred and reproduced by executing a DVD control driver by the CPU 11.

The DVD interface 16 is a disk interface for connecting a disk unit such as an HDD (Hardware Device Driver) or a CD-ROM to the PCI bus 10. In this embodiment, the DVD interface 16 performs data transfer between the CPU 11 and the DVD-ROM drive 21 in accordance with an instruction from the CPU 11. The audio controller 17 controls the input/output of sound data under the control of the CPU 11, and comprises a PCM sound source 171, an FM sound source 172, a multiplexer 173, and a D/A converter 174 in order to output the sound. The multiplexer 173 receives outputs from the PCM sound source 171 and the FM sound source 172, and digital audio data transferred from the DVD decoder 18, and selects one of them.

The digital audio data is obtained by decoding audio data read from the DVD-ROM drive 21. The digital audio data is transferred from the DVD decoder 18 to the audio controller 17 by using not the PCI bus 10 but an audio bus 18*a*. Therefore, the digital audio data can be transferred at a high speed without influencing the performance of the computer system.

The DVD decoder 18 reads an MPEG 2 program stream from the ATAP1 interface 16 under the control of the CPU 11. After dividing the MPEG 2 program stream into video, sub picture, and audio packets, the DVD decoder 18 decodes, synchronizes, and outputs them. The DVD decoder 18 is implemented as, e.g., a PCI expansion card freely detachable from the PCI expansion slot of this computer system. As shown in FIG. 6, the DVD decoder 18 comprises a master transaction control unit 201, a descramble control unit 202, and an MPEG 2 decoder 203.

The master transaction control unit 201 operates the DVD decoder 18 as a bus master (initiator) for sending a transaction onto the PCI bus 10, and executes an I/O read transaction for leading motion picture data from the DVD interface 16. The MPEG 2 program stream read by the master transaction control unit 201 is descrambled for the I picture by the descramble control unit 202, and then sent to the MPEG 2 decoder 203. The MPEG 2 decoder 203 divides the MPEG 2 program stream into video, sub picture, and audio packets, and decodes them.

The decoded audio data is transferred as digital audio data to the audio controller 17 via the audio bus 18*a*, as described above. The decoded video and sub picture are synthesized and sent as digital YUV data (luminance (Y) and chrominance (U,V)) to the multimedia display controller 19. In this case, the digital YUV data is transferred from the DVD decoder 18 to the multimedia display controller 19 by using not the PCI bus 10 but a video bus 18*d*. Therefore, the digital YUV data can also be transferred at a high speed without influencing the performance of the computer system, similar to the digital audio data.

As the video bus 18*d,* a VESA-standard VAFC (VESA Advanced Feature Connector), or a VM-Channel (VESA Media Channel) can be used.

The DVD decoder 18 also has a function of converting digital YUV data and audio data into a TV signal having the NTSC (National Television System Committee) scheme, and outputting the TV signal to the external video input of a TV receiver. The TV signal can be easily transmitted from the DVD decoder 18 to the TV receiver by connecting a cable extending to the TV receiver to a connector arranged on the card of the DVD decoder 18.

The multimedia display controller 19 controls a CRT display used as the display monitor of this system under the control of the CPU 11, and supports display of a text and graphics having the VGA specification, and in addition display of a motion picture.

As shown in FIG. 6, the multimedia display controller 19 comprises a graphics display control circuit (Graphics) 191, a video display control circuit 192, a multiplexer 193, a D/A converter 194, and the like.

The graphics display control circuit 191 is a VGA-compatible graphics controller, which converts the VGA graphics data stored in the video memory (VRAM) 20 into RGB video data, and outputs the RGB video data. The video display control circuit 192 has a video buffer for storing digital YUV data, a YUB-RGB conversion circuit for converting YUV data stored in this buffer into RGB video data, and the like.

The multiplexer 193 selects one of output data from the graphics display control circuit 191 and the video display control circuit 192, or synthesizes VGA graphics from the graphics display control circuit 191 and a video output from the video display control circuit 192, and sends them to the D/A converter 194. The D/A converter 194 converts the video data from the multiplexer 193 into an analog RGB signal, and outputs the signal to the CRT display.

Additional advantages and modifications will readily occur to those skilled in the art. Therefore, the invention in its broader aspects is not limited to the specific details and representative embodiments shown and described herein. Accordingly, various modifications may be made without departing from the spirit of scope of the general inventive concept as defined by the appended claims and their equivalents.

What is claimed is:

1. A method of encrypting a digitally compressed/encoded data stream having plural packets, each packet including a header and a data section, comprising:
   selecting one or more packets from the data stream, wherein at least one packet from the data stream is not selected;
   encrypting the data sections of the selected packets;
   storing data, in headers of the selected packets, indicating that the data sections of the selected packets are encrypted;
   recording a partially encrypted data stream in which the data sections of the selected packets are encrypted and the data sections of remaining packets are not encrypted in a program area of a digital versatile disk; and
   recording a scramble rule for encrypting the data sections of the selected packets in a lead-in area of the digital versatile disk.

2. A method according to claim 1, wherein said digitally compressed/encoded data stream is an MPEG (Moving Picture Experts Group) 2 data stream.

3. A method according to claim 2, wherein intraframe encoded image packets are selected.

4. An apparatus for encrypting a digitally compressed/encoded data stream having plural packets, each packet including a header and a data section, comprising:
   means for selecting one or more packets from the data stream, wherein at least one packet from the data stream is not selected;
   means for encrypting the data sections of the selected packets;
   means for storing data, in headers of the selected packets, indicating that the data sections of the selected packets are encrypted;
   means for recording a partially encrypted data stream in which the data sections of the selected packets are encrypted and the data sections of remaining packets are not encrypted in a program area of a digital versatile disk; and
   means for recording a scramble rule for encrypting the data sections of the selected packets in a lead-in area of the digital versatile disk.

5. An apparatus according to claim 4, wherein said digitally compressed/encoded data stream is an MPEG (Moving Picture Experts Group) 2 data stream.

6. An apparatus according to claim 5, wherein said selecting means selects intraframe encoded image packets.

7. A method of transmitting a digitally compressed/encoded and partially encrypted data stream having plural packets, each packet including a header and data section, comprising:
   selecting one or more packets from the data stream, wherein at least one packet from the data stream is not selected;
   encrypting the data sections of selected packets;
   storing data, in headers of the selected packets, indicating that the data sections of the selected packets are encrypted; and
   transmitting to another site a program sequence and a lead-in sequence, the program sequence including a partially encrypted data stream in which the data sections of the selected packets are encrypted and the data sections of remaining packets are not encrypted, and the lead-in sequence including a scramble rule for encrypting the data sections of the selected packets.

8. A method according to claim 7, wherein said digitally compressed/encoded data stream is an MPEG (Moving Picture Experts Group) 2 data stream.

9. A method according to claim 7, wherein intraframe encoded image packets are selected.

10. An apparatus for transmitting a digitally compressed/encoded and partially encrypted data stream having plural packets, each packet including a header and a data section, comprising;
    means for selecting one or more packets from the data stream, wherein at least one packet from the data stream is not selected;
    means for encrypting the data sections of the selected packets;
    means for storing data, in headers of the selected packets, indicating that the data sections of the selected packets are encrypted; and means for transmitting to another site a program sequence and a lead-in sequence, the program sequence including a partially encrypted data stream in which the data sections of the selected packets are encrypted and the data sections of remaining packets are not encrypted, and the lead-in sequence including a scramble rule for encrypting the data sections of the selected packets.

11. An apparatus according to claim 10, wherein said digitally compressed/encoded data stream is an MPEG (Moving Picture Experts Group) 2 data stream.

12. An apparatus according to claim 11, wherein said selecting means selects intraframe encoded image packets.

* * * * *